(12) United States Patent
Siswick et al.

(10) Patent No.: US 12,319,232 B2
(45) Date of Patent: Jun. 3, 2025

(54) ACCESS CONTROL SYSTEM FOR A VEHICLE

(71) Applicant: JAGUAR LAND ROVER LIMITED, Coventry (GB)

(72) Inventors: Howard Siswick, Coventry (GB); David Waddell, Coventry (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 2 days.

(21) Appl. No.: 17/926,400

(22) PCT Filed: May 18, 2021

(86) PCT No.: PCT/EP2021/063194
§ 371 (c)(1),
(2) Date: Nov. 18, 2022

(87) PCT Pub. No.: WO2021/233943
PCT Pub. Date: Nov. 25, 2021

(65) Prior Publication Data
US 2023/0182685 A1   Jun. 15, 2023

(30) Foreign Application Priority Data
May 18, 2020   (GB) ...................................... 2007304

(51) Int. Cl.
*B60R 25/24*   (2013.01)
(52) U.S. Cl.
CPC .................................. *B60R 25/245* (2013.01)
(58) Field of Classification Search
CPC .............. B60R 25/245; G07C 9/00309; G07C 2209/63; G07C 2009/00507; H04M 11/007; H04W 4/008; H04W 12/08
See application file for complete search history.

(56) References Cited

U.S. PATENT DOCUMENTS 9,682,684 B2 * 6/2017 Miyazawa ............ B60R 25/245
9,778,936 B1 10/2017 Righi
(Continued)

FOREIGN PATENT DOCUMENTS

JP   2007146396 A   6/2007
JP   2009150187 A   7/2009

OTHER PUBLICATIONS

Combined Search and Examination Report for Application No. GB2007304.5, dated Oct. 16, 2020, 6 pages.
(Continued)

*Primary Examiner* — Vernal U Brown
(74) *Attorney, Agent, or Firm* — TROUTMAN PEPPER LOCKE LLP; Dustin B. Weeks; Nicholas Doss

(57) ABSTRACT

An access control system (53) for a vehicle (10) having at least one access system associated with a closure (19) of the vehicle (10), the access control system (53) comprising one or more controllers (22), the access control system configured to receive a first signal (34) from an associated user device (12), the first signal (34) being indicative that the user device (12) is beyond a threshold distance from the vehicle (10); receive a second signal (30) indicative of a user request to change a lock mode of the access control system (53); operate in a lock mode selected from a plurality of lock modes in dependence on receipt of the second signal (30); and generate a control signal to activate the at least one access system (51) into a lock state in dependence on the selected lock mode and in response to the first signal (34) indicating that the proximity of the user device (12) to the vehicle (10) exceeds the threshold distance.

28 Claims, 6 Drawing Sheets

(56) References Cited

U.S. PATENT DOCUMENTS

| | | | |
|---|---|---|---|
| 10,850,707 B1 | 12/2020 | Farmer | |
| 2002/0063472 A1* | 5/2002 | Irvin | B60R 25/406 307/10.1 |
| 2007/0109093 A1 | 5/2007 | Matsubara et al. | |
| 2010/0271171 A1* | 10/2010 | Sampei | B60R 25/00 340/5.6 |
| 2018/0048769 A1* | 2/2018 | Alshinnawi | H04W 12/08 |
| 2020/0066078 A1* | 2/2020 | Huschenbett | G01S 13/76 |

OTHER PUBLICATIONS

International Search Report and Written Opinion for Application No. PCT/EP2021/063194, dated Aug. 30, 2021, 18 pages.

"16.11.1 Key words" In: Tom Denton: "Automobile Electrical and Electronic Systems, Third Edition", 2004, Elsevier, Butterworth-Heinemann, Oxford, UK, XP055831817, ISBN: 978-0-7506-6219-2, pp. 439-440, p. 440, section "Keypad entry".

Machine translation into English of Japanese Office Action corresponding to application 2022-570180, dated Jul. 23, 2024, 10 pages.

English translation of Japanese Office Action corresponding to application 2022-570180, dated Jan. 16, 2024, 8 pages.

* cited by examiner

ACCESS CONTROL SYSTEM FOR A VEHICLE

TECHNICAL FIELD

The present disclosure relates to an access control system for a vehicle and particularly, but not exclusively, to a keyless access/entry system for a vehicle such as a motor vehicle. Aspects of the invention relate to an access control system for a vehicle, to a method of operating an access control system for a vehicle and to a vehicle itself.

BACKGROUND

It is known to provide access control systems that include passive entry and passive starting (PEPS) systems for motor vehicles. The vehicle user typically carries a key fob which can communicate with a control unit in the vehicle via a receiver.

Upon receipt of an initiating trigger (for example when a vehicle door handle is operated), the control unit sends a signal to a transmitter to emit a powerful Low Frequency (LF) electromagnetic field, the energy from which wakes up the key fob using a charge pump technique. Once awake, the key fob can then send signals over a Radio Frequency (RF) communications channel to control various functions of the vehicle, such as locking or locking various ones of the vehicle door locks. The control unit then actuates the door locks in accordance with the signals received.

Existing systems may implement functionality that enables the vehicle to lock automatically when the vehicle user exits and leaves the vicinity of the vehicle. Such systems may be referred to as walking away locking (WAL) systems. They provide the advantage that the vehicle is always locked automatically as the user walks away from the vehicle, and allow for the circumstance of the user forgetting to lock the vehicle, or finding it inconvenient to activate the key fob to do so (for example, when carrying luggage). However, such existing systems present disadvantages to the vehicle user, such as an inability to make repeated trips back to the vehicle without the vehicle locking automatically when it may not be desirable for this to happen. Other limitations of these systems mean that the functionality is not always ideal for all circumstances.

It is against this background that the invention has been devised.

SUMMARY OF THE INVENTION

According to an aspect of the present invention there is provided an access control system for a vehicle having at least one access system associated with a closure of the vehicle. The access system is capable of being activated into a plurality of lock states. The access control system comprises one or more controllers and is configured to: receive a first signal from an associated user device, the first signal being indicative that the user device is beyond a threshold distance from the vehicle; receive a second signal indicative of a user request to change a lock mode of the access control system, and in dependence on receipt of the second signal select a lock mode to operate in from a plurally of lock modes; and, in dependence on the lock mode selected, either generate a control signal to activate the at least one access system into a different lock state in response to the first signal indicating that the proximity of the user device to the vehicle exceeds the threshold distance, or maintain the at least one access system in its current lock state in response to the first signal indicating that the proximity of the user device to the vehicle exceeds the threshold distance.

In this manner, a system is provided the enables a user to change the lock mode of the access control system such that the response of the system to the user device exceeding a threshold distance from the vehicle can be selected/changed by the user.

Optionally, the plurality of lock modes that may be selected may comprise, for example, one or more walking away locking enabled modes and/or a walking away locking disabled mode as described in greater detail below.

Optionally, the one or more controllers may collectively comprise: at least one electronic processor having an electrical input for receiving the first signal indicative that the user device beyond a threshold distance from the vehicle and the second signal indicative of a user request to change a lock mode of the access control system; and at least one memory device electrically coupled to the at least one electronic processor and having instructions stored therein; and wherein the at least one electronic processor is configured to access the at least one memory device and execute the instructions thereon so as to, in dependence on receipt of the second signal, either generate the control signal to activate the at least one access system into a different lock state in response to the first signal indicating that the proximity of the user device to the vehicle exceeds the threshold distance, or maintain the at least one access system in its current lock state in response to the first signal indicating that the proximity of the user device to the vehicle exceeds the threshold distance.

Optionally, the access control system may be configured such that, if no second signal is received, a control signal is generated to operate the access control system in a first lock mode in which the controller generates the control signal to activate the at least one access system into a first lock state in response to the first signal indicating that the proximity of the user device to the vehicle exceeds the threshold distance.

The first lock mode may comprise, for example, a single locking mode and the first lock state may comprise, for example, a single locking state as described below.

Optionally, the first lock state may be a state in which activation of a door latching mechanism by an external handle is inhibited whilst activation of the door latching mechanism by an internal handle is enabled.

Optionally, at least one lock mode selectable upon receipt of the second signal may be a double locking mode in which the control signal activates the at least one access system into a second lock state. Such a second lock state may accordingly comprise a double locking state in which activation of the door latching mechanism by the internal handle and the external handle is inhibited.

Optionally, the double lock mode may be selected from the plurality of lock modes in response to a first instance of the second signal being received within a double lock time period of a second instance of the second signal being received.

Optionally, at least one lock mode selectable upon receipt of the second signal may be a disable lock mode in which the at least one access system is maintained in an unlock state so that activation of the door latching mechanism by the external handle is enabled and activation of the door latching mechanism by the internal handle is enabled in response to the first signal indicating that the proximity of the user device to the vehicle exceeds the threshold distance.

Optionally, the access control system may be configured to receive a third signal which is indicative that the user is preparing to exit, or is exiting, the vehicle, and wherein the access control system operates in a lock mode selected from the plurality of lock modes in dependence on the first, second and third signals. Preparing to exit the vehicle may include one or more of a door opening, an engine stopping, an end of a drive event, a key out of ignition, a driver seatbelt release, a parking brake applied etc.

Optionally, the third signal may be generated in response to a door of the vehicle associated with a vehicle user being opened or in response to a handle on a door of the vehicle associated with the vehicle user being operated.

Optionally, the access control system may be configured such that the third signal must be received before the second signal for the access control system to select a lock mode from the plurality of lock modes.

Optionally, the access control system may be configured such that the second signal must be received by the access control system within a selection time period of the third signal for the access control system to select a lock mode from the plurality of lock modes.

Optionally, the access control system may be configured to receive the first signal from a primary lock/unlock input device associated with the vehicle. The primary lock/unlock input device may comprise, for example, a vehicle key fob or a mobile communication device. Optionally, the primary lock/unlock device may be the same as the user device.

Optionally, the access control system may be configured to receive the second signal from a secondary lock/unlock input device associated with the vehicle. The secondary lock/unlock input device may be a lock mode request module. Optionally, the secondary lock/unlock input device may be fitted to the vehicle.

Optionally, the access control system may be configured to generate an alert signal if the second lock mode is selected. Such an alert signal may comprise one or more of an audible, visual or haptic alert signal.

Optionally, the access control system comprises the at least one access system associated with the closures of the vehicle.

According to a further aspect of the present invention there is provided a vehicle comprising an access control system as herein described.

According to a yet further aspect of the present invention, there is provided a method of controlling an access control system for a vehicle having at least one access system associated with a closure of the vehicle. The method comprises: receiving a first signal from an associated user device, the first signal being indicative that the user device is beyond a threshold distance from the vehicle; receiving a second signal indicative of a user request to change a lock mode of the access control system, and in dependence on receipt of the second signal select a lock mode to operate in from a plurally of lock modes; and, in dependence on the lock mode selected, either generating a control signal to activate the at least one access system into a lock state in response to the first signal indicating that the proximity of the user device to the vehicle exceeds the threshold distance, or maintaining the at least one access system in its current lock state in response to the first signal indicating that the proximity of the user device to the vehicle exceeds the threshold distance.

According to a yet further aspect of the present invention, there is provided a computer program product comprising instructions which, when the program is executed by a computer, cause the computer to carry out the method of controlling an access control system as here described.

According to a yet further aspect of the present invention, there is provided a non-transitory computer-readable medium having stored thereon the computer program product of the previous aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
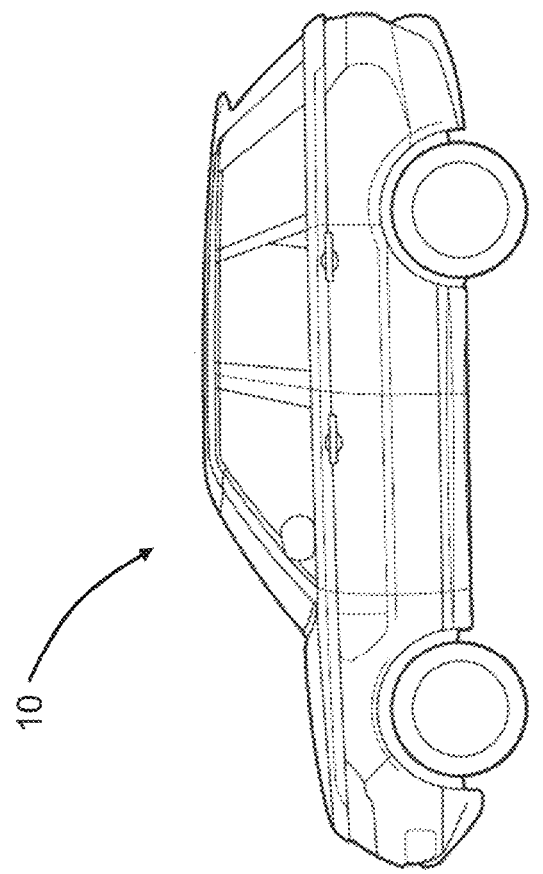
FIG. 1 shows a diagram of a vehicle and a vehicle user in the vicinity of the vehicle.
Figure 1:
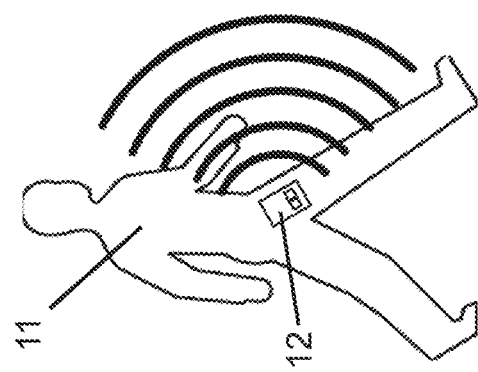
Figure 2:
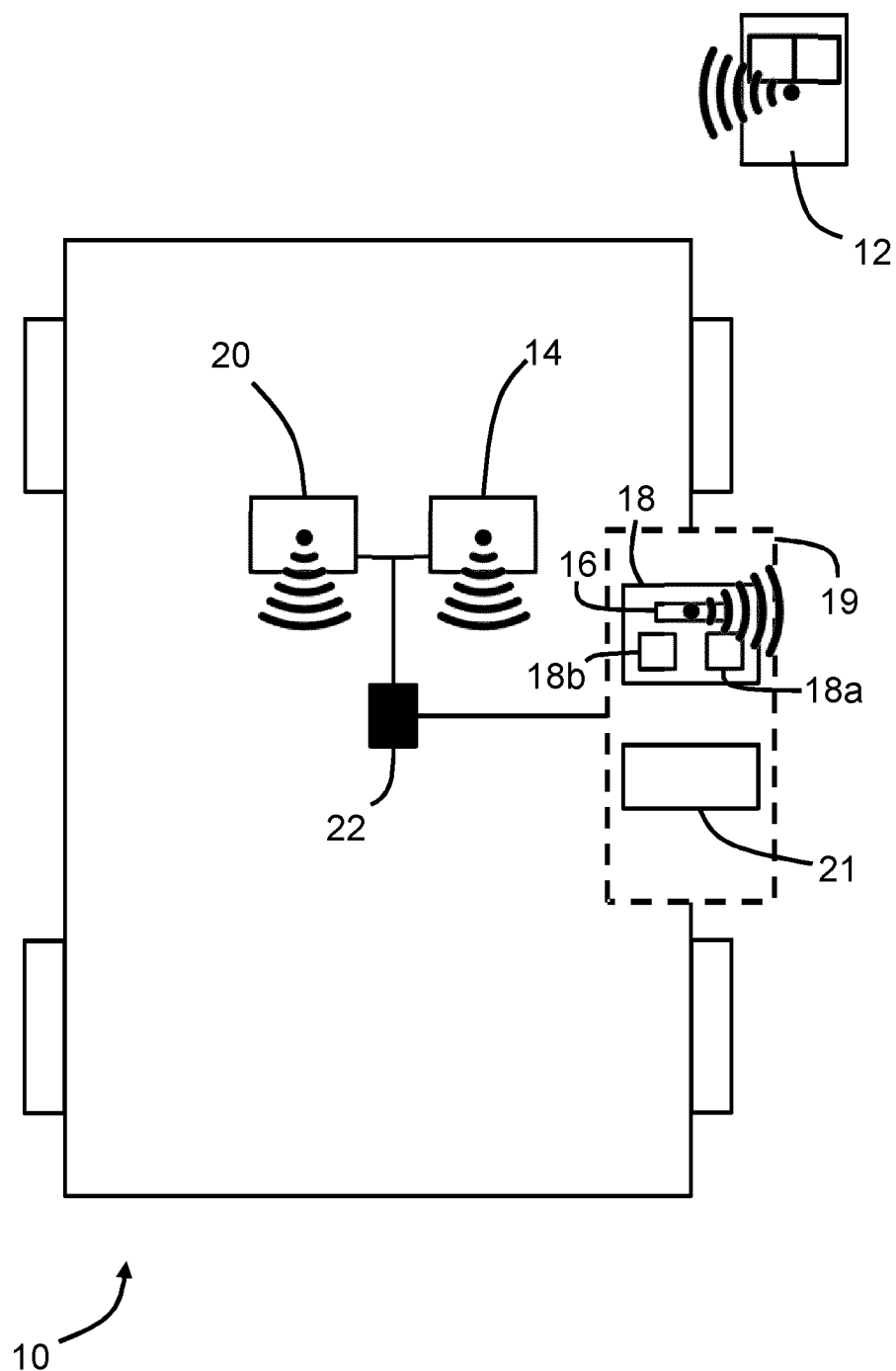
FIG. 2 shows a schematic plan view of the vehicle of FIG. 1 which is provided with an access control system of the invention.

FIGS. 1 and 2 show a vehicle 10 comprising an access control system (not identified in FIG. 1). As shown in FIG. 1, a vehicle user 11 carries a user device in the form of a key fob 12 which may be used to interact with the access control system (e.g. a passive entry passive start system) on board the vehicle 10 in order to gain access to the vehicle 10 and also potentially to deploy certain vehicle systems (e.g. deployment of retracting door handles or illumination of vehicle lights to facilitate vehicle access) and to control certain vehicle systems as a vehicle user 11 exits and leaves the vehicle 10. The key fob 12 may be regarded as a primary lock/unlock input device, capable of communicating driver requests to the access control system of the vehicle 10 to lock or unlock a closure of the vehicle 10.

Turning to FIG. 2, the vehicle 10 is shown to comprise a first low frequency (LF) transmitter 14 located in, for example, the engine compartment of the vehicle 10 and a second LF transmitter 16 located in the closure 19 of the vehicle 10. The closure 19 may be a door or tailgate of the vehicle 10, and in FIG. 2 forms a side door of the vehicle.

In FIG. 2, the second LF transmitter 16 is located in a handle assembly 18 (e.g. a door handle assembly) of the vehicle 10, the handle assembly 18 forming part of the vehicle closure 19. It is noted that only two transmitters 14, 16 are shown in FIG. 1 for clarity. It should also be noted that, although only one handle assembly 18 is shown in FIG.

2, the vehicle 10 may comprise multiple handle assemblies 18, one associated with each vehicle closure 19, and in certain arrangements each handle assembly 18, or even each closure 19 of the vehicle 10, may comprise a transmitter 16. In other arrangements, the transmitter 14 located in the engine compartment may not be present and the passive entry system may, for example, rely on the handle-based transmitters 16 for operation, although other locations within or on the vehicle 10 are envisaged. The vehicle additionally comprises a radio frequency (RF) receiver 20.

The first and second LF transmitters 14, 16 may be selectively controlled to repetitively send out LF signals. These LF signals decrease in strength as they travel away from the transmitters 14, 16 and are received by the key fob 12. In response, the key fob 12 sends an RF signal to the receiver 20 that is indicative of the strength of the LF signal received from the transmitters 14, 16, and is therefore indicative of the distance of the key fob from the transmitters 14, 16. A virtual perimeter P may therefore be defined around the vehicle 10 at a threshold distance from the vehicle 10, beyond which the strength of the LF signals sent by the transmitters 14, 16 falls below a predetermined value. This perimeter P is shown schematically in FIG. 3.

The LF transmitters 14, 16 may be arranged to output radio signals at a frequency of about 125 kHz. The key fob 12 may be configured to receive signals at 125 kHz and transmit RF signals at a frequency of about 433 MHz, The RF receiver 20 may be configured to receive signals at a frequency of about 433 MHz.

It is noted that the above frequency values are provided by way of example only and may vary between different vehicle markets. The low frequency (LF) range, for example, is generally taken to encompass the range of 30 kHz to 300 kHz. The radio frequency (RF) range is generally taken to encompass the range of 3 kHz to 300 GHz. The RF frequency described herein is 433 MHz but the inventors are aware of, for example, other systems that operate at 315 MHz.

In the illustrated example, the handle assembly 18 comprises both an external door handle 18a and an internal door handle 18b to enable opening of the respective door 19 of the vehicle 10. The vehicle 10 also comprises multiple latching mechanisms 21, one associated with each vehicle closure 19. Each latching mechanism 21 is configured in use to cooperate with the external handle 18a and the internal handle 18b of the respective door.

An access system 51 (FIG. 5) comprises the handle assemblies 18 and the latching mechanisms 21. The access system 51 may be activated into various lock states as described below.

The external and internal handles 18a, 18b can either be connected to or disconnected from their respective latching mechanism 21. In some cases only the external handles 18a may be disconnected from the latching mechanisms 21, allowing the internal handles 18b to be used to actuate the latching mechanisms 21 whilst inhibiting the external handles 18a from being used to actuate the latching mechanisms 21. The doors 19 of the vehicle 10 can therefore be opened from inside the vehicle 10 using the internal handles 18b, but not from outside the vehicle 10 using the external handles 18a. In this case, the access system 51 is considered to be in a state of 'single locking' or 'central locking', which may be regarded as a first lock state.

It should be understood that this description uses the term 'connected to' in relation to the handles 18a, 18b and the latching mechanisms 21a, 21b to refer to the activation of the respective latching mechanism 21a, 21b by the respective handle 18a, 18b being enabled, and the term 'disconnected from' to refer to the activation of the respective latching mechanism 21a, 21b by the respective handle 18a, 18b being inhibited. In the present embodiment the connection or disconnection is achieved through a direct mechanical connection between the respective handle 18a, 18b and the latching mechanism 21, However, it will be understood that other systems may use means other than direct mechanical connection to enable or inhibit the activation of the latching mechanisms 21 by external and internal handles 18a, 18b. For example, electronic or electrical connections (wired or wireless connections) may be used to enable or inhibit activation of the latching mechanisms 21 by the handles 18a, 18b. The terms 'connected to' and 'disconnected from' are therefore intended to refer to any means of connection including electrical or electronic, even if the handles 18a, 18b are not mechanically connected to the latching mechanisms 21.

In the case where both the external handles 18a and the internal handles 18b are disconnected from the latching mechanisms 21, neither handle 18a, 18b can be used to actuate the respective latching mechanism 21 and so the doors 19 cannot be opened from either inside or outside the vehicle 10 using the handles 18a, 18b. In this case, the access system 51 is considered to be in a state of 'double locking', which may be regarded as a second lock state.

In the case where both the external handles 18a and the internal handles 18b are connected to the latching mechanism 21, both handles 18a, 18b can be used to actuate the latching mechanism 21. The doors 19 of the vehicle 10 can therefore be opened from both inside and outside the vehicle 10 using the handles 18a, 18b. In this case, the access system 51 is considered to be in an unlocked state, or simply 'unlocked'.

Figure 5:
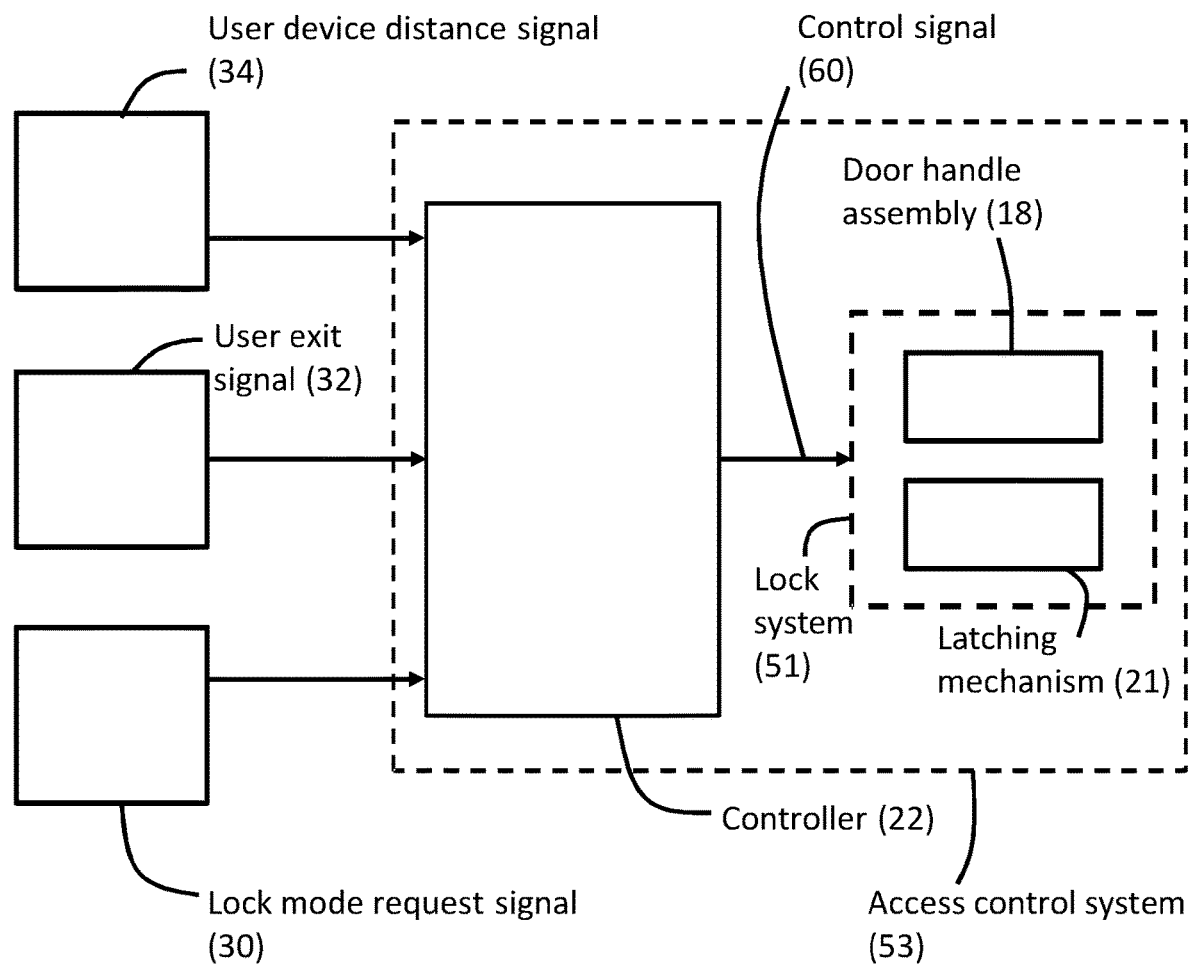
FIG. 5 shows a control diagram showing various signals that are input to, and output from, the access control system of the vehicle.

The vehicle 10 further comprises an access control system 53, shown in schematic detail in FIG. 5. The access control system 53 comprises a controller 22 and an access system 51 as defined above.

The access control system 53 may operate in various modes of operation, affecting the lock state into which the access system 51 is activated.

In a conventional unlock mode of operation, a vehicle user 11 in possession of the key fob 12 approaches the vehicle 10 and pulls an external handle 18a. A sensor (not shown) in the handle assembly 18 sends a signal to the access control system 53 which arranges for the transmitter 14, 16 to send an LF signal which is received by the key fob 12.

In response to receiving the LF signal from the vehicle 10, the key fob 12 is arranged to send an unlock request to the vehicle 10 on the RF signal frequency. The RF signal is received by the receiver 20 which sends the received signal to the access control system 53 which then sends a door unlock signal to the doors 19. On receiving the door unlock signal, both the internal and external handles 18b, 18a are connected to the latching mechanism 21 and the access system 51 is activated into an unlocked state.

Following, or in parallel with, the communications between the fob 12 and the receiver 20 within the vehicle 10, the key fob 12 may additionally communicate with the vehicle 10 via an ultra-wideband signal sent from an ultra-wideband antenna 40.

The above passive access control system 53 delivers the feature of passive entry, which enables the vehicle user 11 to gain entry to their vehicle 10 without having to physically interact with the key fob 12. Until the vehicle user 11 performs an action with their vehicle 10, the key fob 12 remains in a very low power dormant state. However, in order to deliver enhanced features such as approach unlocking, welcome lighting and walk away locking, the vehicle 10 has to be able to detect and react to an approaching key fob 12 well before user intervention is expected and additionally needs to be able to track the vehicle user's departure from the vehicle 10.

Figure 3:
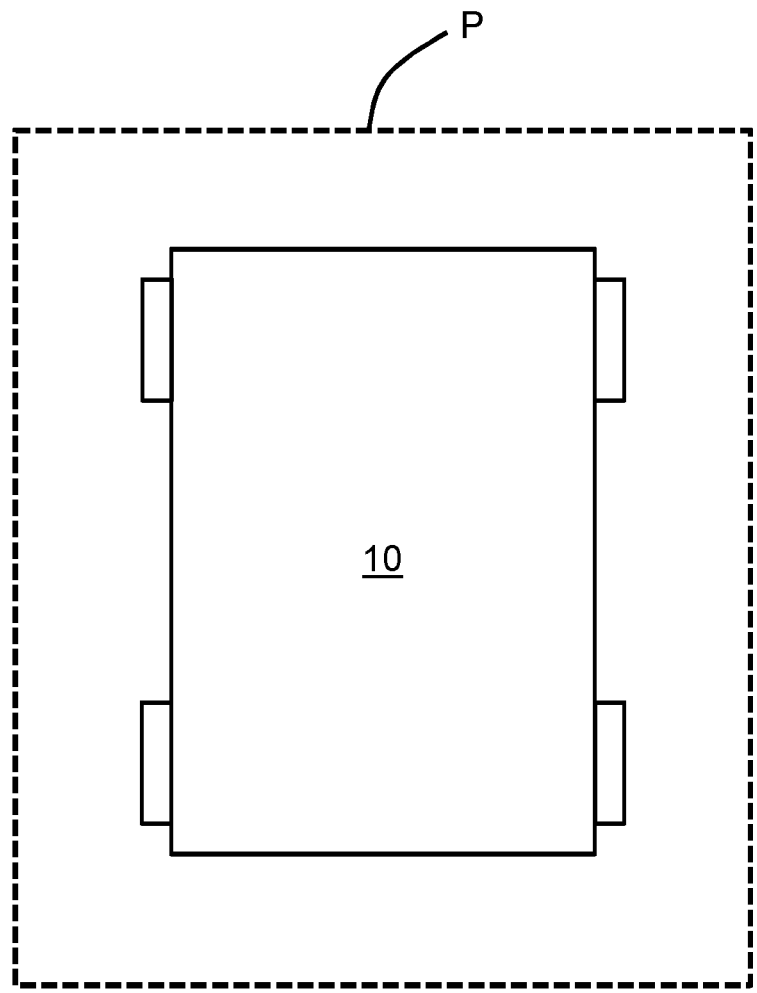
FIG. 3 shows a schematic plan view of the vehicle of FIGS. 1 and 2 to illustrate a threshold distance around the vehicle.

Referring especially to FIG. 3, it is noted in this context that the LF field generated by the vehicle 10 may only extend approximately 2 metres from the vehicle 10. In this context, therefore, the perimeter P, which defines a threshold distance from the vehicle, extends approximately 2 metres from the vehicle 10. The threshold distance for the activation of enhanced features is therefore approximately 2 metres from the vehicle 10. It will be appreciated that the threshold distance may be set at another suitable value, and that 2 metres is just an example.

The access control system 53 is configured to operate in a plurality of lock modes. One such lock mode is a single lock walk away locking (WAL) mode in which the access control system 53 is operated in such a way that the access system 51 is activated into a state of single locking when the vehicle user 11 and the key fob 12 cross the perimeter P. At the end of the current drive event of the vehicle 10, the vehicle user 11 leaves the vehicle 10 with the key fob 12 in their possession. A drive event is considered to be the process of a vehicle user 11 starting the vehicle 10, using the vehicle 10 for some purpose (e.g. completing a journey) and then stopping the vehicle 10. The vehicle 10 does not have to travel anywhere during the drive event, although it will be appreciated that this will usually be the case.

When the key fob 12 exits the perimeter P, the RF signals sent by the key fob 12 to the receiver 20 are indicative that the key fob 12 is beyond the threshold distance from the vehicle 10. The RF signals sent by the key fob 12 may be referred to as user device distance signals 34. The controller 22 of the access control system 53 then sends a control signal to the access system 51 to activate the access system 51 into a state of single locking, inhibiting the external handles 18a from activating the latching mechanism and thus securing the vehicle 10. It is to be noted, therefore, that in the single lock WAL mode it is only the external handles 18a which are disconnected from the respective latching mechanisms 21 when the key fob 12 leaves the perimeter P, and not the internal handles 18b.

The single lock WAL mode allows the vehicle user 11 to secure the vehicle 10 without having to take the posterior action of, for example, pressing a lock button on the key fob 12 in order to lock the vehicle 10 after they have exited. Not only does this benefit user convenience, it also protects against forgetfulness on the part of the vehicle user 11, who may be distracted while leaving the vehicle 10 and therefore forget to secure the vehicle 10.

However, the single lock WAL mode of the access system 51 may not provide all possible advantages to the vehicle user 11 during common scenarios encountered during everyday use of the vehicle 10. If repeated trips are required back to the vehicle 10 after the drive event has ended, for instance in the example of unloading multiple items from the vehicle 10, or if a passenger returns to the vehicle 10 to unload items after the vehicle user 11 has left the perimeter P with the key fob 12, they will be unable to enter the vehicle 10 once the single lock WAL mode is activated. This would also be the case for the vehicle user 11 if they have put the key fob 12 down and returned to the vehicle 10 without it.

Another scenario in which the single lock WAL mode may not be so convenient is in its adoption of single locking as opposed to double locking. With the access system 51 activated into a state of single locking, although the external handles 18a are disconnected from the latching mechanism 21, the vehicle 10 may still be vulnerable to theft from a person who manages to gain access to an internal handle 18b, perhaps by breaking a window. In embodiments of the present invention, this situation is protected against if the access system 51 is activated into a state of double locking as the user walks away, wherein both external and internal handles 18a, 18b are disconnected from the latching mechanism 21. Regulations in various territories prevent double locking being a standard lock mode for securing a vehicle 10 as emergency services may be left unable to access an injured passenger in a double locked vehicle 10. Instead, in order to activate the access system 51 into a double locked state, a deliberate action must be taken by the vehicle user 11.

The current invention addresses the problems with the state of the art by giving the vehicle user 11 greater control over the lock modes employed by the access control system 53, particularly in relation to a WAL function.

Figure 4:
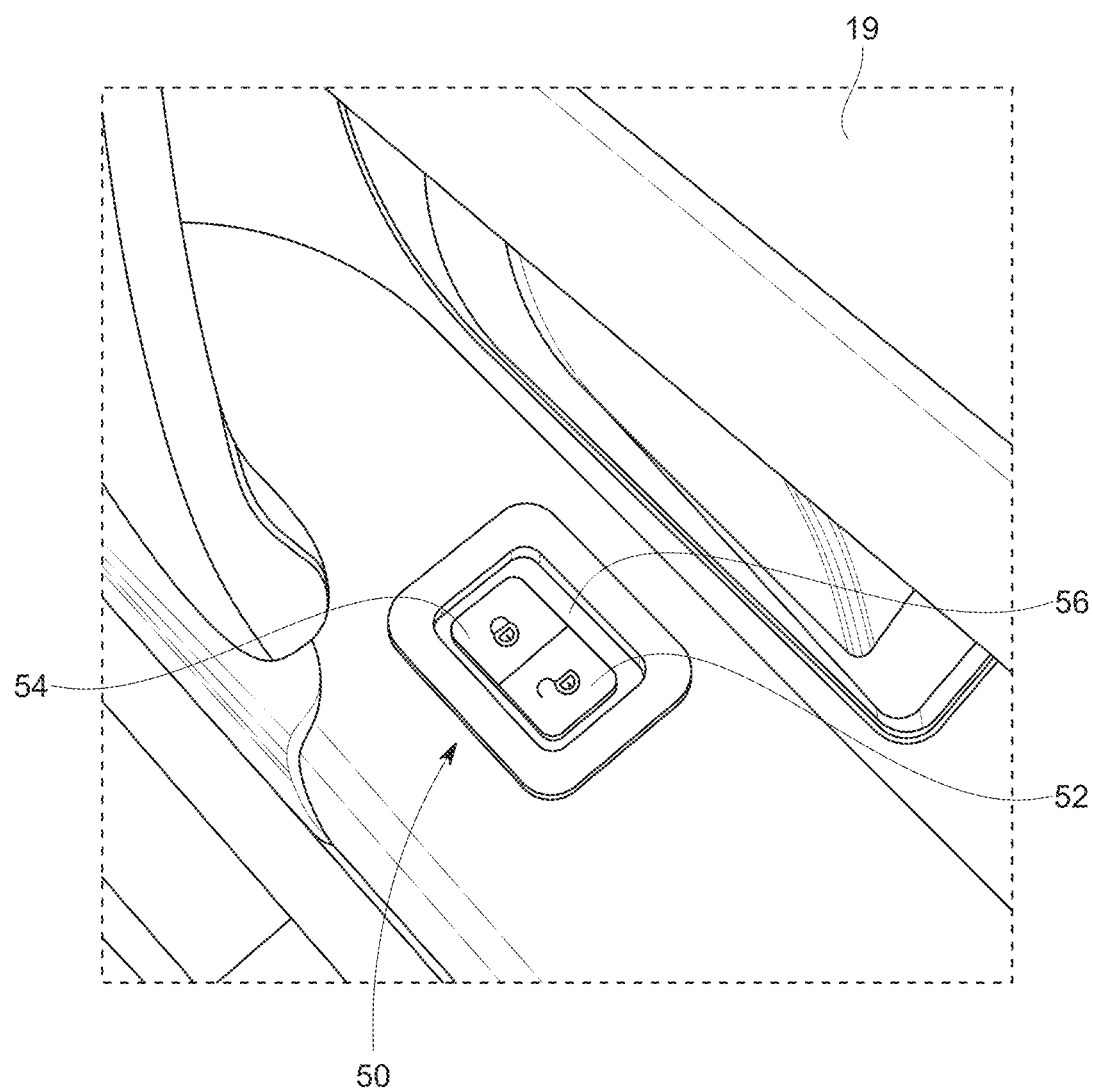
FIG. 4 shows a closure of the vehicle of FIGS. 1, 2 and 3, together with a lock mode request module.

In embodiments of the invention, the vehicle 10 incorporates an access control system 53 of the type described above but with additional functionality provided by the access control system 53 receiving signals from a lock mode request module 50, shown in FIG. 4, which enables the access control system 53 to select different lock modes to operate in. The lock mode request module may be considered to be a secondary lock/unlock input device.

The lock mode request module 50 may be integral with the vehicle 10, or may form part of a user device associated with the vehicle 10, such as a key fob 12. In FIG. 4, the lock mode request module 50 forms a part of the vehicle closure 19 and comprises a first request button 52 and a second request button 54, configured to generate different requests as will become apparent below. In certain embodiments of the invention, the first request button 52 may be an unlock request button and the second request button 54 may be a lock request button.

The first request button 52 may typically be used in the vehicle 10 to unlock the vehicle closure 19 when the vehicle user 11 is inside the vehicle 10, and the second request button 54 may typically be used in the vehicle 10 to lock the vehicle closure 19 when the vehicle user 11 is inside the vehicle 10. In other words, actuation of the first request button 52 sends a signal to the controller 22, which interprets this signal as an unlock request signal and sends a control signal to the access system 51 to activate it into an unlocked state. Similarly, actuation of the second request button 54 sends a signal to the controller 22 which interprets this signal as a lock request signal and sends a control signal to the access system 51 to activate it into a state of single locking.

However, the controller may also receive a user exit signal 32 that indicates that the vehicle user 11 is preparing to exit, or is exiting, the vehicle 10 and a user device distance signal 34 which provides an indication to the controller 22 about the distance of the vehicle user 11 (and more particularly the key fob 12) from the vehicle 10. In the case that the controller 22 has received a user exit signal 32, signals from the first and second request buttons 52, 54 are not interpreted as unlock or lock request signals but are instead interpreted as lock mode request signals 30, which are indicative of a user request to change a lock mode of the access control system 53 and enable the selection of different lock modes for the access control system 53 to operate in.

It will be appreciated by the skilled person that in alternative embodiments of the invention, the functionality described below may be realised through a lock mode request module 50 that comprises only a first request button 52, or comprises more than two request buttons. The skilled person will also appreciate that the lock mode request module 50 may comprise request buttons that are dedicated to providing lock mode request signals 30 and do not have any other function within the vehicle 10. In this case, the controller 22 would always interpret signals from the lock mode request module 50 as lock mode request signals 30.

In addition, the lock mode request module 50 need not form a part of the vehicle door and may be anywhere within, or outside of, the vehicle 10. For example, the lock mode request module may be located on the steering wheel or on a touchscreen of an infotainment system of the vehicle 10. However, arranging the lock mode request module 50 within or on the vehicle closure 19 provides a particularly convenient arrangement as the vehicle 11 user has to use the closure 19 when exiting the vehicle and so a synergy between the user exit signal 32 and the actuation of either the first or second request button 52, 54 is created.

In a first embodiment, the access control system 53 is configured to enable a vehicle user 11 to select a lock mode in which the automatic single lock WAL mode described above is disabled in the event that a user exit signal 32 is generated and the first request button 52 is subsequently actuated. Without the controller 22 receiving the user exit signal 32, generated when the vehicle user 11 is preparing to exit, or is exiting, the vehicle 10, actuation of the first request button 52 would cause the access system 51 to be activated into an unlocked state as described above. However, receipt of the user exit signal 32 by the controller 22 causes the functionality triggered by actuation of the first request button 52 to be altered.

In more detail, actuation of the first request button 52, once the controller 22 has received a user exit signal 32, causes the lock mode request module 50 to send a signal to the controller 22 that is interpreted as a lock mode request signal 30. A lock mode request signal 30 resulting from actuation of the first request button 52 acts as a request that the access control system 53 selects a disable WAL mode to operate in. In the disable WAL mode, the automatic activation of the access system 51 into a state of single locking when the vehicle user 11 leaves the perimeter P with the key fob 12 is disabled such that the access system 51 remains in an unlocked state, even when the vehicle user 11 leaves the perimeter P with the key fob 12.

In other words, the automatic single lock WAL mode is disabled and the controller 22 does not send the control signal to the access system 51 to inhibit activation of the latching mechanism 21 by the external handles 18*a* when the vehicle user 11 leaves the perimeter P with the key fob 12, so that the vehicle 10 remains in an unlocked state at this time. It should be appreciated that, even though the automatic single lock WAL mode is disabled in the disable WAL lock mode, it is still possible for the access system 51 to be activated into a state of single locking through other means, such as by use of the key fob 12.

The actuation of the first request button 52, and subsequent operation of the disable WAL mode as described above, allows for multiple trips to be made back to the vehicle 10 without the access system 51 being automatically activated into a state of single locking.

Whilst the access control system 53 is operating in the disable WAL mode, actuation of the second request button 54 causes the lock mode request module 50 to send a signal to the controller 22 that is interpreted as a lock mode request signal 30. In this situation, the lock mode request signal 30 acts as a request that the access control system 53 reselects the single lock WAL mode to operate in. When the vehicle user 11 leaves the perimeter P with the key fob 12, the controller 22 of the access control system 53 therefore sends a control signal to the access system 51 to activate it into a state of single locking, with activation of the latching mechanism 21 by the external handle 18*a* inhibited. Therefore, should the vehicle user 11 realise that the actuation of the first request button 52 and selection of the disable WAL mode occurred in error, the vehicle user 11 may actuate the second request button 54 to reset the access control system 53 to operate in the single lock WAL mode.

In an alternative embodiment, once the controller 22 has received a user exit signal 32, receipt of two instances of a signal from the second request button 54 within a predetermined time period (herein referred to as the double lock time period) is interpreted as a lock mode request signal 30. A lock mode request signal 30 resulting from a double actuation of the second request button 54 within the double lock time period acts as a request that the access control system 53 selects a double lock WAL mode to operate in. In the double lock WAL mode, the access system 51 is activated into a state of double locking when the vehicle user 11 leaves the perimeter P with the key fob 12. In other words, two instances of the signal from the second request button 54 being received by the controller 22 within the double lock time period, along with a user exit signal 32, is taken as an indication that the double lock WAL mode is to be selected by the access control system 53. Typically, the double lock time period for receiving the first and second instances of the signal from the second request button 54 may be 2 to 3 seconds.

In the double lock WAL mode, the controller 22 sends a control signal to the access system 51 to cause disconnection of both the external and internal handles 18*a*, 18*b* from the latching mechanism 21 when the vehicle user 11 leaves the perimeter P with the key fob 12. In this way, a first instance of actuation of the second request button 54 being followed within the double lock time period by a second instance of actuation of the second request button 54, in combination with a user exit signal 32, causes the access control system 53 to select the double lock WAL mode of operation, causing the standard operation of the single lock WAL mode to be superseded by the vehicle user's deliberate request for the access control system 53 to select the double lock WAL mode instead.

In this way, the access control system 53 is able to activate the access system 51 into a state of double locking to improve vehicle security whilst still adhering to requirements that such systems are only implemented deliberately.

Whilst the access control system 53 is operating in the double lock WAL mode, a further actuation of the second request button 54 causes the lock mode request module 50 to send a signal to the controller 22 that is interpreted as a lock mode request signal 30. In this situation, the lock mode request signal 30 acts as a request that the access control system 53 reselects the single lock WAL mode to operate in. When the vehicle user 11 leaves the perimeter P with the key fob 12, the controller 22 of the access control system 53 therefore sends a control signal to the access system 51 to activate it into a state of single locking, with activation of the latching mechanism 21 by the external handle 18*a* inhibited. The benefit of this feature is that, should the vehicle user 11 realise that the double actuation of the second request button 54 and selection of the double lock WAL mode occurred in error, the vehicle user 11 may actuate the second request button 54 to reset the access control system 53 to operating in the single lock WAL mode.

As described previously, the controller 22 is configured to receive user exit signals 32 that indicate that the vehicle user 11 is preparing to exit, or is exiting, the vehicle 10. In the event that a user exit signal 32 is received, actuation of either the first or second request button 52, 54 at the same time as, or within a predetermined time period (herein referred to as the selection time period) of, the user exit signal 32 causes signals sent to the controller by the first and second request buttons 52, 54 to be interpreted as lock mode request signals and initiates selection of a lock mode for the access control system 53 to operate in from a plurality of available lock modes. Operation of the first and second request buttons 52, 54 in these circumstances therefore triggers a different functionality than when a user exit signal 32 has not been received.

The user exit signal 32 may be generated in response to the operation of the handle assembly 18 on the door associated with the vehicle user 11, or the operation of the internal handle 18b on said door or the opening of said closure 19. However, this signal 32 may be generated in response to various other stimuli, such as: an engine start/stop button being pressed to stop the engine of the vehicle 10 from running, the current drive event ending, a key being taken out of the vehicle ignition, a seatbelt of the vehicle user 11 being released or the vehicle handbrake being applied.

The signal that is sent by the lock mode request module 50, following actuation of the first or second request button 52, 54, must be received by the controller 22 within the selection time period of the user exit signal 32 being received, in order for it to be interpreted as a lock mode request signal 30 and for the selected lock mode to be changed. That is, the controller 22 must first receive the user exit signal 32 and then, within the selection time period, the controller 22 must also receive the signal which is sent by the lock mode request module 50 and interpret it as a lock mode request signal 30. If the signal sent by the lock mode request module 50 is not received within the selection time period, the signal sent by the first or second request button 52, 54 is not interpreted as a lock mode request signal 30 but as either an unlock request signal or a lock request signal, depending on which request button was actuated. If this is the case, no action is taken with regard to the selection of a different lock mode for the closure 19 access control system 53 to operate in.

The aforementioned functionality can be utilised to reduce the likelihood that a user request to change a lock mode of the access control system 53 is sent accidentally, as without receipt of a user exit signal 32 by the controller 22, signals sent by the first and second request buttons 52, 54 will not be interpreted as lock mode request signals 30.

As discussed earlier, it will be obvious to the skilled person that there is no requirement for the functionality of the lock mode request module 50 to be added into existing vehicle hardware and that the invention could equally be realised by incorporating dedicated request buttons into the electronic architecture of the vehicle 10. The first and second request buttons 52, 54 may also be incorporated into the key fob 12, either adding to the functionality of existing buttons thereon or provided as dedicated request buttons.

In the case where dedicated request buttons exist such that the signals sent therefrom are always interpreted as lock mode request signals 30, it may still be helpful to implement the time period check of a selection time period occurring after receipt of a user exit signal 32 by the controller 22 as this will help to minimise instances of accidental selections of a different lock mode by the access control system 53.

The controller 22 may also send a signal (not shown) to a system of the vehicle 10 to generate an alert to inform the vehicle user 11 that a different lock mode has been selected by the access control system 53. This alert may take the form of an audible alert, such as a tone or a visual alert, such as a display on a central console of the vehicle 10, or a haptic alert, or a combination of any of these types of alert. In one embodiment it may be particularly convenient for a visual alert to be presented at the site of the lock mode request module 50, so that when either the first request button 52 or second request button 54 is actuated to select the disable WAL mode or double lock WAL mode, the vehicle user 11 is able to see an immediate and clear indication that a different lock mode has been selected. Typically, the visual alert may be presented through illumination of a surround 56 for the first request button 52 or the second request button 54, as shown in FIG. 5.

Figure 6:
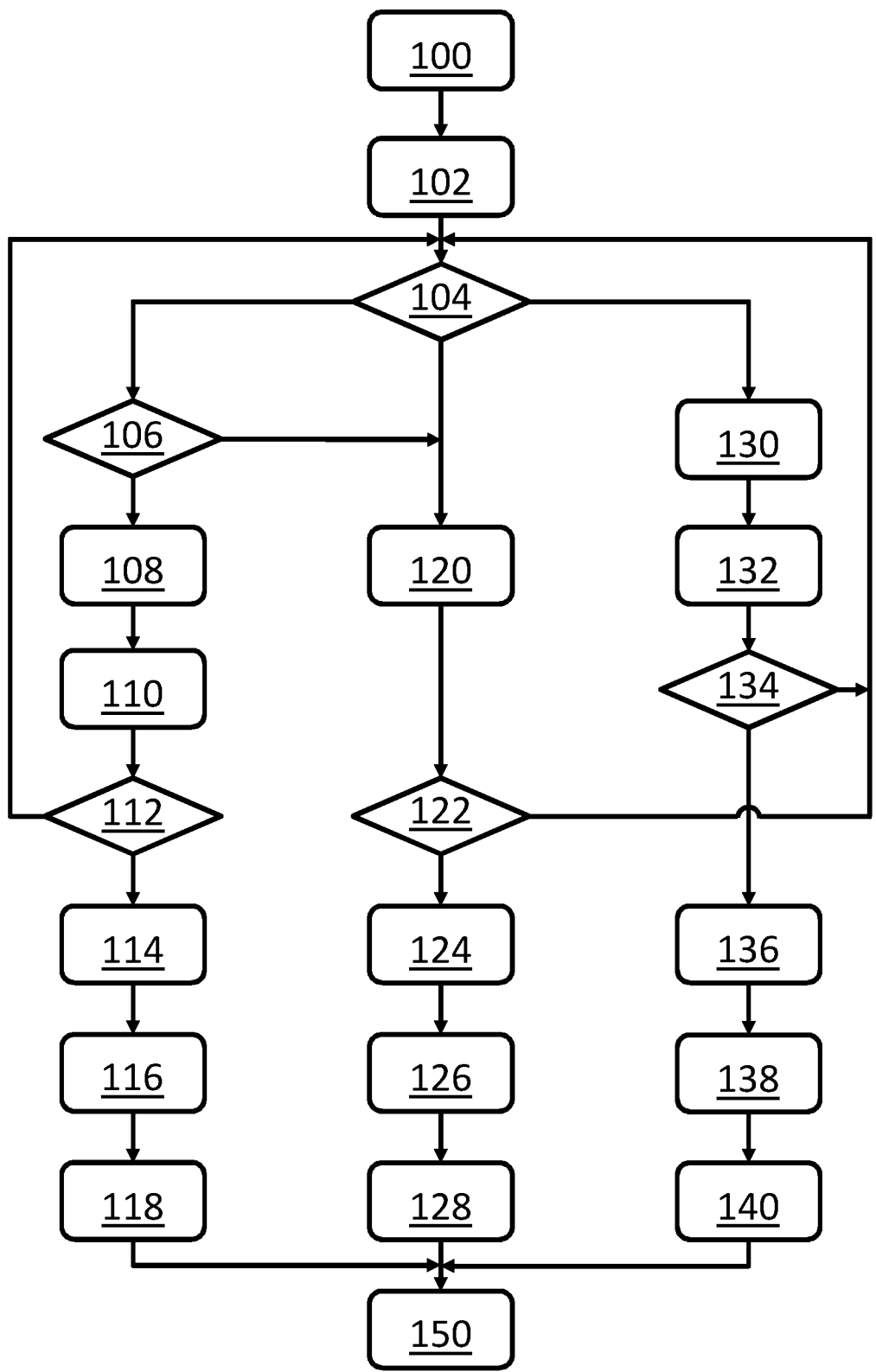
FIG. 6 is a flow chart showing a method of controlling an access control system for a vehicle.

A method of controlling an access control system 53 in accordance with an embodiment of the invention is shown by the flow chart shown in FIG. 6. The steps of the method of controlling the access control system 53 will now be described in further detail with reference to the flow chart.

In the embodiment of the invention shown in FIG. 6, the user exit signal 32 indicating that the vehicle user 11 is preparing to exit, or is exiting, the vehicle 10 is generated in response to a closure 19 associated with the vehicle user 11 being opened. At step 100, the user exit signal 32 indicating that the closure 19 has been opened is received, and the method moves on to step 102, where the selection time period begins for signals received from the lock mode request module 50 to be interpreted as lock mode request signals 30.

At step 104, either the first request button 52 is actuated by the vehicle user 11, the second request button 54 is actuated by the vehicle user 11, or neither request button is actuated by the vehicle user 11. In the embodiment depicted by the flow chart in FIG. 6, it is assumed that the first request button 52 is an unlock request button and the second lock request button is a lock request button, as described with reference to the previous figures.

If the request button actuated by the vehicle user 11 at step 104 is the lock request button 54, the method progresses to step 106, where the access control system 53 waits to see if the lock request button 54 has been actuated for a second time within the double lock time period. If the lock request button 54 is actuated for a second time within the double lock time period, the method moves on to step 108, where the double lock WAL mode of operation is selected. If the lock request button 54 is not actuated for a second time within the double lock time period, the method instead progresses to step 120, described below.

After the double lock WAL mode is selected at step 108, the method moves to step 110, where an alert to inform the vehicle user 11 that the double lock WAL mode has been selected is generated. At step 112, the access control system 53 waits to see if the vehicle user 11 actuates an alternative request button. If the vehicle user 11 does select an alternative request button, the method reverts back to step 104; if no button is selected the method progresses to step 114 where the door associated with the vehicle user 11 is closed.

At step 116, the key fob 12 is taken beyond the threshold distance from the vehicle 10, causing the method to progress to step 118 where the access system 51 is activated into a state of double locking, with both internal and external handles 18b, 18a disconnected from the latching mechanism 21.

Alternatively, if the request button actuated at step 104 is the unlock request button 52, the method progresses to step 130, where the disable WAL mode is selected and thence onto step 132, where an alert to inform the vehicle user 11 that the disable WAL mode has been selected is generated. At step 134 the access control system 53 waits to see if the vehicle user 11 actuates an alternative request button. If the vehicle user 11 does select an alternative request button, the method reverts back to step 104; if no button is selected the method progresses to step 136 where the closure 19 associated with the vehicle user 11 is closed.

At step 138, the key fob 12 is taken beyond the threshold distance from the vehicle 10, causing the method to progress to step 140 where the access system 51 remains in an unlocked state, with both internal and external handles 18b, 18a connected to the latching mechanism 21.

Alternatively, if no request button is actuated at step 104, the method progresses to step 120, where the single lock WAL mode is selected. From there, the method progresses to step 122, where the access control system waits to see if the vehicle user 11 actuates an alternative request button. If the vehicle user 11 does select an alternative request button, the method reverts back to step 104; if no button is selected the method progresses to step 124 where the door associated with the vehicle user 11 is closed.

At step 126, the key fob 12 is taken beyond the threshold distance from the vehicle 10, causing the method to progress to step 128 where the access system 51 is activated into a state of single locking, with internal handles 18b connected to the latching mechanism 21 and the external handles 18a disconnected from the latching mechanism 21.

After any of steps 118, 128 or 140, the method progresses to step 150, where the method terminates.

As used herein, the terms 'controller' or 'control module' will be understood to include both a single control module or controller and a plurality of control modules or controllers collectively operating to provide the required control functionality. A set of instructions could be provided which, when executed, cause said control modules(s) to implement the control techniques described herein (including the method(s)). The set of instructions may be embedded in one or more electronic CPU or processors.

Alternatively, the set of instructions could be provided as software to be executed by one or more electronic processor (s). For example, a first control module may be implemented in software run on one or more electronic processors, and one or more other control modules may also be implemented in software run on one or more electronic processors, optionally the same one or more processors as the first control module. It will be appreciated, however, that other arrangements are also useful, and therefore, the present invention is not intended to be limited to any particular arrangement.

In any event, the set of instructions described above may be embedded in a computer-readable storage medium (e.g. a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or electrical or other types of medium for storing such information/instructions.

It will be understood that, although in the chronology of the system described above, the controller 22 of the access control system 53 receives the user exit signal 32 and then the signal interpreted as the lock mode request signal 30 and then the user device distance signal 34, these signals be considered in any chronology and any may be referred to as the first or second or third signal.

Many modifications may be made to the above examples without departing from the scope of the present invention as defined in the accompanying claims.

The invention claimed is:

1. An access control system for a vehicle having at least one access system associated with a closure of the vehicle, the access system being capable of being activated into a plurality of lock states, wherein the access control system comprises one or more controllers and is configured to:
   receive a first signal from an associated user device, the first signal being indicative that the user device is beyond a threshold distance from the vehicle;
   receive a second signal indicative of a user request to change a lock mode of the access control system and in dependence on receipt of the second signal select a lock mode to operate in from a plurality of lock modes;
   if no second signal is received, generate a control signal to operate the access control system in a first lock mode in which the controller generates the control signal to activate the at least one access system into a first lock state in response to the first signal indicating that a proximity of the user device to the vehicle exceeds the threshold distance, the first lock state being a state in which activation of a door latching mechanism by an external handle is inhibited whilst activation of the door latching mechanism by an internal handle is enabled; and
   in dependence on the lock mode selected, either
      (a) generate a control signal to activate the at least one access system into a locked state in response to the first signal indicating that the proximity of the user device to the vehicle exceeds the threshold distance, or
      (b) maintain the at least one access system in its current lock state in response to the first signal indicating that the proximity of the user device to the vehicle exceeds the threshold distance.

2. The access control system as claimed in claim 1, wherein at least one lock mode selectable upon receipt of the second signal is a disable lock mode in which the at least one access system is maintained in an unlocked state so that activation of the door latching mechanism by the external handle is enabled and activation of the door latching mechanism by the internal handle is enabled in response to the first signal indicating that the proximity of the user device to the vehicle exceeds the threshold distance.

3. The access control system as claimed in claim 1, wherein the access control system is configured to receive a third signal which is indicative that the user is preparing to exit, or is exiting, the vehicle, and wherein the access control system operates in a lock mode selected from the plurality of lock modes in dependence on the first, second and third signals.

4. The access control system as claimed in claim 3, wherein the access control system is configured such that the third signal must be received before the second signal for the access control system to select a lock mode from the plurality of lock modes.

5. The access control system as claimed in claim 3, wherein the access control system is configured such that the second signal must be received by the access control system within a selection time period of the third signal for the access control system to select a lock mode from the plurality of lock modes.

6. The access control system as claimed in claim 3, wherein the third signal is generated in response to a door of the vehicle associated with a vehicle user being opened or in response to a handle on a door of the vehicle associated with the vehicle user being operated.

7. The access control system as claimed in claim 1, wherein the access control system is configured to receive the first signal from a primary lock/unlock input device associated with the vehicle.

8. The access control system as claimed in claim 1, wherein the access control system is configured to receive the second signal from a secondary lock/unlock input device associated with the vehicle.

9. The access control system as claimed in claim 8, wherein the secondary lock/unlock input device is fitted to the vehicle.

10. The access control system as claimed in claim 1, wherein the access control system is configured to generate an alert signal if a second lock state is selected.

11. The access control system as claimed in claim 1, comprising the at least one access system associated with the closures of the vehicle.

12. A vehicle comprising the access control system as claimed in claim 1.

13. The access control system as claimed in claim 1, wherein at least one lock mode selectable upon receipt of the second signal is a double lock mode in which the control signal activates the at least one access system into a second lock state.

14. An access control system for a vehicle having at least one access system associated with a closure of the vehicle, the access system being capable of being activated into a plurality of lock states, wherein the access control system comprises one or more controllers and is configured to:
  receive a first signal from an associated user device, the first signal being indicative that the user device is beyond a threshold distance from the vehicle;
  receive a second signal indicative of a user request to change a lock mode of the access control system and in dependence on receipt of the second signal select a lock mode to operate in from a plurality of lock modes;
  if no second signal is received, generate a control signal to operate the access control system in a first lock mode in which the controller generates the control signal to activate the at least one access system into a first lock state in response to the first signal indicating that a proximity of the user device to the vehicle exceeds the threshold distance, wherein at least one lock mode selectable upon receipt of the second signal is a double lock mode in which the control signal activates the at least one access system into a second lock state; and
  in dependence on the lock mode selected, either
    (a) generate a control signal to activate the at least one access system into a locked state in response to the first signal indicating that the proximity of the user device to the vehicle exceeds the threshold distance, or
    (b) maintain the at least one access system in its current lock state in response to the first signal indicating that the proximity of the user device to the vehicle exceeds the threshold distance.

15. The access control system as claimed in claim 14, wherein the double lock mode is selected from the plurality of lock modes in response to a first instance of the second signal being received within a double lock time period of a second instance of the second signal being received.

16. The access control system as claimed in claim 14, wherein at least one lock mode selectable upon receipt of the second signal is a disable lock mode in which the at least one access system is maintained in an unlocked state so that activation of a door latching mechanism by an external handle is enabled and activation of the door latching mechanism by an internal handle is enabled in response to the first signal indicating that the proximity of the user device to the vehicle exceeds the threshold distance.

17. The access control system as claimed in claim 14, wherein the access control system is configured to receive a third signal which is indicative that the user is preparing to exit, or is exiting, the vehicle, and wherein the access control system operates in a lock mode selected from the plurality of lock modes in dependence on the first, second and third signals.

18. The access control system as claimed in claim 17, wherein the access control system is configured such that the third signal must be received before the second signal for the access control system to select a lock mode from the plurality of lock modes.

19. The access control system as claimed in claim 17, wherein the access control system is configured such that the second signal must be received by the access control system within a selection time period of the third signal for the access control system to select a lock mode from the plurality of lock modes.

20. The access control system as claimed in claim 17, wherein the third signal is generated in response to a door of the vehicle associated with a vehicle use being opened or in response to a handle on a door of the vehicle associated with a vehicle user being operated.

21. The access control system as claimed in claim 14, wherein the access control system is configured to receive the second signal from a secondary lock/unlock input device associated with the vehicle.

22. The access control system as claimed in claim 14, wherein the access control system is configured to receive the first signal from a primary lock/unlock input device associated with the vehicle.

23. The access control system as claimed in claim 21, wherein the secondary lock/unlock input device is fitted to the vehicle.

24. The access control system as claimed in claim 14, wherein the access control system is configured to generate an alert signal if the second lock state is selected.

25. The access control system as claimed in claim 14, comprising at least one access system associated with the closures of the vehicle.

26. A method of controlling an access control system for a vehicle having at least one access system associated with a closure of the vehicle, the method comprising:
  receiving a first signal from an associated user device, the first signal being indicative that the user device is beyond a threshold distance from the vehicle;
  receiving a second signal indicative of a user request to change a lock mode of the access control system, and in dependence on receipt of the second signal select a lock mode to operate in from a plurality of lock modes;
  if no second signal is received, generating a control signal to operate the access control system in a first lock mode in which the controller generates the control signal to activate the at least one access system into a first lock state in response to the first signal indicating that a proximity of the user device to the vehicle exceeds the threshold distance, the first lock state being a state in which activation of a door latching mechanism by an external handle is inhibited whilst activation of the door latching mechanism by an internal handle is enabled; and in dependence on the lock mode selected, either
- (c) generating a control signal to activate the at least one access system into a locked state in response to the first signal indicating that the proximity of the user device to the vehicle exceeds the threshold distance, or
- (d) maintaining the at least one access system in its current lock state in response to the first signal indicating that the proximity of the user device to the vehicle exceeds the threshold distance.

27. A non-transitory, computer-readable storage medium storing instructions thereon that, when executed by one or more electronic processors, causes the one or more electronic processors to carry out the method of claim 26.

28. A method of controlling an access control system for a vehicle having at least one access system associated with a closure of the vehicle, the method comprising:

receiving a first signal from an associated user device, the first signal being indicative that the user device is beyond a threshold distance from the vehicle;

receiving a second signal indicative of a user request to change a lock mode of the access control system and in dependence on receipt of the second signal select a lock mode to operate in from a plurality of lock modes, if no second signal is received, generating a control signal to operate the access control system in a first lock mode in which the controller generates the control signal to activate the at least one access system into a first lock state in response to the first signal indicating that a proximity of the user device to the vehicle exceeds the threshold distance, wherein at least one lock mode selectable upon receipt of the second signal is a double lock mode in which the control signal activates the at least one access system into a second lock state; and in dependence on the lock mode selected, either
- (a) generating a control signal to activate the at least one access system into a locked state in response to the first signal indicating that the proximity of the user device to the vehicle exceeds the threshold distance, or
- (b) maintaining the at least one access system in its current lock state in response to the first signal indicating that the proximity of the user device to the vehicle exceeds the threshold distance.

* * * * *